Aug. 21, 1934.   P. DUGELAY   1,971,176

FOUR-CYCLE INTERNAL COMBUSTION ENGINE

Filed April 9, 1931   2 Sheets-Sheet 1

Inventor
Paul Dugelay
per [signature]
Attorney

Aug. 21, 1934.    P. DUGELAY    1,971,176
FOUR-CYCLE INTERNAL COMBUSTION ENGINE
Filed April 9, 1931    2 Sheets-Sheet 2

Inventor
Paul Dugelay
per
Attorney

UNITED STATES PATENT OFFICE 1,971,176

FOUR CYCLE INTERNAL COMBUSTION ENGINE

Paul Dugelay, Paris, France, assignor to Societe d'Exploitation de Brevets Pour L'Industrie, l'Aviation et l'Automobile (S. E. B. I. A.), Paris, France, a corporation of France Application April 9, 1931, Serial No. 528,754 In France April 18, 1930

3 Claims. (Cl. 123—52)

The present invention is for improvements in and relating to four cycle internal combustion engines and superchargers therefor and has for its object certain novel devices and means for regulating the supply of air or gaseous fuel by compressors to multiple cylinder engines either of the Diesel type or of the usual explosion type.

These novel means of regulation comprise the combination of the following features.

*1st.*—The pressure of the supply gases is maintained as constant as possible by the combination of means for transferring gases from cylinder to cylinder of the engine and a corresponding regulation of the periods of supply of gases to the engine by the supercharging compressor, in such manner that the periodical pulsations of delivery of the gases by the compressor are considerably damped.

The transmission of gases under pressure from one cylinder of the engine to another is accomplished by extending the duration of the opening of the inlet valve of one cylinder after an induction stroke of its piston during a considerable portion of the succeeding return stroke thereof, whilst the inlet valve of the cylinder following in order of ignition is opened in the normal manner after the passage of the piston thereof past the upper dead centre at the commencement of its induction stroke. During this phase, when the said two inlet valves are open together the volume of gas or air contained in the first cylinder is diminished by exactly the quantity with which the volume contained in the second cylinder is increased, in such a manner that the quantity of air or gas required to be drawn from the induction collector of the engine is zero, and thus there is simply a transference under pressure of a part of the gases contained in the first cylinder into the second cylinder. The operation of the compressor is regulated so that no gas or air is delivered therefrom during this period of transference and, furthermore, the induction period proper of a cylinder, that is to say, that period during which the inlet valve of the inducing cylinder only is open coincides with a delivery from the compressor calculated to give the volume of air or gas exactly necessary to fill the said engine cylinder in accordance with the pressure desired. This arrangement produces the result that the amount of gas or air contained in the induction collector of the engine remains constant and that, consequently, variations of pressure, in the said collector are substantially eliminated.

*2nd.*—The provision of means for varying the pressure of supply by air or gas to the engine by controlling the volumetric output of the compressor combined with a corresponding variation of the phase of transference of air or gas from one cylinder of the engine to another in such manner that the volume delivered with each delivery stroke of the compressor is always equal to the volume of gas or air necessary to complete the filling of the corresponding working cylinder at the desired pressure.

*3rd.*—A connection between the control of the variation of output of the compressor and the variation of the closing of each inlet valve of the engine in such manner that the two stages of compression obtained, that is, the stage in the compressor and the stage in the engine cylinder, remain always practically equal and the work absorbed by the total compression of the air or gaseous mixture is thus always a minimum.

*4th.*—The cooling of the air or gaseous mixture between the two stages of compression which is obtained by contact of the air or gas with the surfaces of the induction collector common to all the working cylinders.

The arrangements set forth above combined together, provide a combined supercharger and engine having a rational double stage compression with cooling of the air or gases between compression stages which possess the following advantages:—

(a) In respect of an ordinary explosion engine, the production of high degree of compression without causing self-ignition or detonation of the cylinder charge, the temperature of the combustible mixture at the end of the compression remaining below that which gives rise to these phenomena and which are inevitable in engines operating with single stage compression.

In respect of Diesel engines, supercharging is accomplished without increasing the final temperature of compression.

(b) A minimum amount of work is required for compression in consequence of the regulation of the compression in two stages which are always approximately equal, and of the suppression of any intermediate expansion of the air or gases between the two phases.

(c) Variable degrees of compression are obtainable by the corresponding regulation of the output of the compressor and of the closing of the inlet valves of the engine, thus causing the simultaneous variation of the two stages of compression, with the possibility of either maintaining these two stages always approximately equal in the case of an ordinary explosion engine, or of obtaining a constant final compression temperature of the air in the case of a Diesel engine.

(d) The production of high degree of volumetric expansion, and consequently a high thermo-dynamic output since the degree of expansion is independent of the degree of volumetric compression effected in the engine cylinder and may always be greater than the degree of total compression, so as to avoid losses in the exhaust.

(e) An improvement in the homogeneity of the air and fuel mixture is obtained in explosion engines by the turbulence caused by the transference of the gases from one cylinder to another, and a better gasification of the fuel by the influence of the surfaces swept by the gases, this latter point also effecting as a consequence, the cooling of any hot points which may exist in the cylinder.

In the accompanying drawings forming part hereof,

Figure 4:
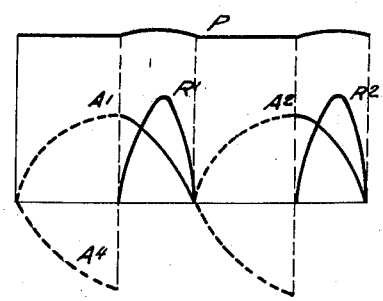

Fig. 4 graphically illustrates the variations in the volume of gas admitted into the engine during a complete revolution of the crank shaft.

Figure 5:
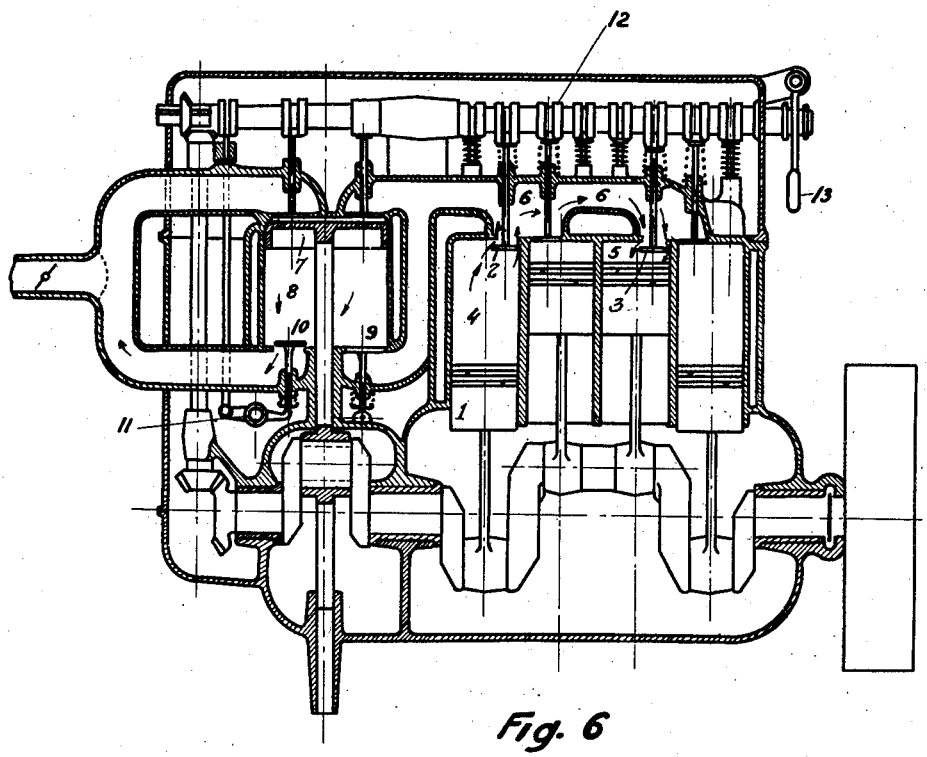

Fig. 5 is a diagrammatic longitudinal section of an engine embodying the invention and the features thereof.

Figure 6:
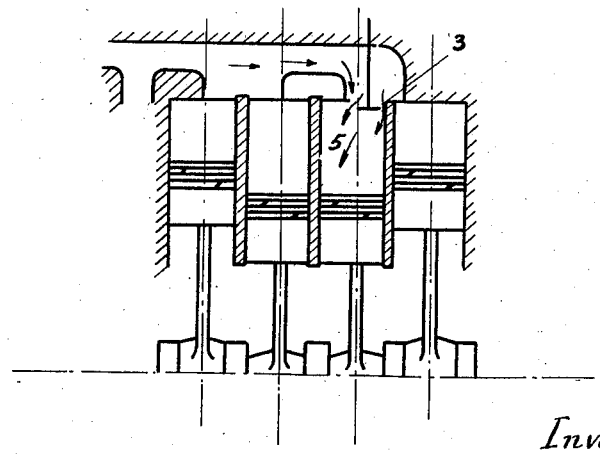

Fig. 6 is a fragmentary section of the same with the pistons in different positions than in Fig. 5.

Throughout the views, the same reference characters indicate the same or corresponding parts.

The figures on the annexed drawings and the description below refer more particularly to the application of this invention to a four cycle engine provided with four cylinders in line and is an example which is given for greater facility in description and is in no way limitative either as regards the number of cylinders which may be employed or as regards their arrangement.

Figure 1:
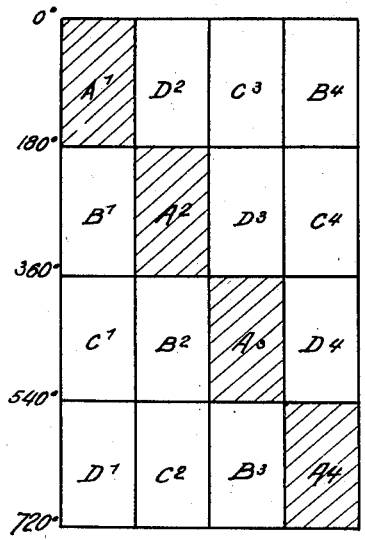
Fig. 1 is a diagram indicating the successive strokes of a piston of a four cylinder, four cycle explosion engine.

In the diagram of Fig. 1, the shaded squares $A_1$, $A_2$, $A_3$, $A_4$ correspond to the induction strokes in each of the cylinders; $B_1$, $B_2$, $B_3$, $B_4$ to the compression strokes; $C_1$, $C_2$, $C_3$, $C_4$ to the expansion strokes and $D_1$, $D_2$, $D_3$, $D_4$ to the exhaust strokes; the cylinders being denoted in order of their ignition.

The said diagram indicates that the four induction periods follow each other without interruption and without overlapping. Nevertheless, during the course of the induction period $A_1$, it is known that on the piston of the corresponding cylinder making a complete stroke, its speed continually varies and may be represented by the curve $A_1$ in the graph shown in Figure 2. In the same way the speed of the piston of the second cylinder during its induction stroke is represented by the curve $A_2$ and it is clear that the volume of gas admitted at each instant into the cylinder varies according to the same periodic law.

Figure 2:
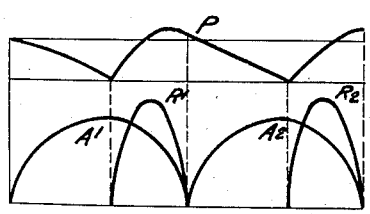
Fig. 2 is a combination diagram of the curves representing the relative variations of the pistons of two corresponding cylinders of said engine.

The curves $R_1$, $R_2$ in Figure 2 indicate the volume of gas delivered by the compressor during one complete revolution of the engine compressor; comparison of the two curves $A_1$ and $R_1$ shows that the pressure in the induction collector of the engine varies in a periodical manner, diminishing during the first part of the induction stroke since the engine cylinder is filled with gas without the delivery from the compressor, and increasing suddenly when the delivery valves of the compressor open.

A series of pulsations are thus produced which are represented diagrammatically by the curve P in Figure 2 and which affects the regularity of the induction operation and may cause condensation of the petrol from the gas.

Figure 3:
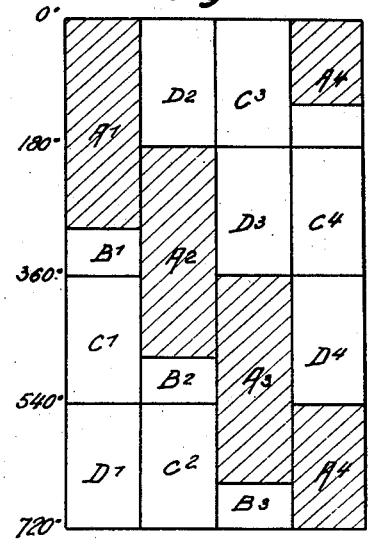
Fig. 3 is a diagram similar to that of Fig. 1 wherein the succession of four strokes refer to an engine and compressor made according to the present invention and embodying the features of the same.

The diagram in Figure 3 illustrates the succession of four strokes in an engine and compressor similar to that to which Figures 1 and 2 relate but constructed in accordance with the present invention. The opening of the inlet valve of each cylinder is prolonged for more than half of the upward stroke of the corresponding piston, the compression in the said cylinder being reduced by the same amount, and the other strokes remaining identical with those of the ordinary four stroke cycle.

In the graph of Fig. 4 are shown the variations of the volume of gas admitted into the cylinders during a complete rotation of the crank shaft of the engine; the dotted portion of the curves $A_1$, $A_2$ being equalized in such manner that the periods during which there is an effective admission of gas into a cylinder coincide with the periods of delivery $R_1$, $R_2$ of the compressor, the curve of variation of pressure in the compressor being indicated by the curve P.

Figure 5 illustrates a diagrammatic longitudinal section of a four cylinder four cycle engine at the moment of transference of gases from the first cylinder into the cylinder which follows it in the order of ignition.

In Fig. 6, which is a fragmentary view of the same engine during the induction period proper of cylinder 5, during which period the valve 3 alone is open, the piston 1 is at the lower dead centre and is about to commence an upward stroke; the inlet valve 2 is arranged to remain open during an initial period of the opening of the inlet valve 3 of the following cylinder. The result is that gases contained in the cylinder 4 are driven out by the piston 1 and are drawn into the cylinder 5 through the valves 2 and 3 and the induction collector 6.

The crank shaft of the compressor is arranged to rotate at the same speed as the engine crank shaft and the compressor comprises a number of working cylinders equal to one-half the number of the engine cylinders. For the four cylinder engine illustrated in Figure 5, the compressor comprises a double acting cylinder, the piston being actuated by the crank shaft of the engine by means of a slide block and guide.

The piston 7 of the compressor is shown at the upper dead centre, at the moment when it is about to commence a compression stroke in the cylinder 8. The delivery valve 9 is closed and is arranged to be opened only at the moment when the inlet valve 2 of the engine cylinder 4 closes, so as to cause the effective admission of gas into the engine to coincide with the delivery of the compressor.

The inlet valve 10 of the compressor cylinder 8 is shown open in Figure 5 and the closing thereof is controlled by the cam shaft 12 of the engine through the medium of the rocker arm 11 in such a manner that the volumetric delivery of the compressor is varied in combination with the closing of the inlet valves of the engine cylinders.

This arrangement permits the degree of total compression of the engine to be varied whilst always preserving the approximate equality of the two stages of compression.

The simultaneous variation of the closing of the inlet valves of the engine and the inlet valves of the compressor is obtained by moving the cam shaft 12 axially by means of any known form of control such, for example, as the lever 13. Several cams are arranged adjacent to each other upon the cam shaft 12 and may be brought successively above the driving members for the valves.

Having now fully described my invention, I claim:

1. In a four cycle internal combustion engine having a plurality of cylinders provided with inlet and outlet valves and pistons, the combination of means for charging the engine with a gaseous mixture, comprising an induction collector common to all of said cylinders, a compressor having a plurality of compression chambers which are half the number of the motor cylinders, connected with said collector and provided with both inlet and outlet valves and means for timing the said valves so as to cause the compressor to periodically deliver its charge into the collector, means for synchronizing the engine speed with the delivery periods of the compressor so that each such period begins when the piston of a cylinder has already completed a large part of its induction stroke, in order to feed the cylinder by the compressed charge during the remaining part of the induction stroke, and means for transferring the compressed charge from one cylinder to another in a cyclical order, comprising timing means for timing the cylinder inlet and outlet valves so that each particular cylinder receives a compressed charge from another cylinder through the collector during the portion of the induction stroke thereof which precedes the respective delivery period of said compressor, and so that said particular cylinder exhausts the compressed charge through the collector to still another cylinder during a large part of its return stroke following the delivery period of said compressor, and also that the remaining charge in said particular cylinder is further compressed during the remaining part of the return stroke thereof.

2. A four cycle internal combustion engine according to claim 1, including means for maintaining the degree of compression in the engine cylinder during the return stroke of the piston thereof substantially equal to the degree of compression in the compressor.

3. A four cycle internal combustion engine according to claim 1, including means for simultaneously regulating the operation of the valves of the engine cylinders and of the delivery valves of the compressor in order to maintain the degrees of compression produced in said cylinders equal to the degree of compression produced in said compressor.

PAUL DUGELAY.